United States Patent [19]

Higgins

[11] Patent Number: 5,270,922
[45] Date of Patent: Dec. 14, 1993

[54] SYSTEM FOR DISTRIBUTING, PROCESSING AND DISPLAYING FINANCIAL INFORMATION

[75] Inventor: Gerard M. Higgins, Staten Island, N.Y.

[73] Assignee: Merrill Lynch & Company, Inc., New York, N.Y.

[21] Appl. No.: 725,951

[22] Filed: Jun. 27, 1991

Related U.S. Application Data

[63] Continuation of Ser. No. 626,339, Jun. 29, 1984, abandoned.

[51] Int. Cl.$^5$ .......................... G06F 15/20; G06G 7/52
[52] U.S. Cl. .................................................. 364/408
[58] Field of Search ................ 364/408, 229.41, 283.2; 340/825.27; 395/800

[56] References Cited

U.S. PATENT DOCUMENTS

| | | | |
|---|---|---|---|
| 3,611,294 | 10/1971 | O'Neill et al. | 340/825.26 |
| 3,792,462 | 2/1974 | Casey et al. | 340/324 |
| 3,823,387 | 7/1974 | McClellan | 340/825.27 |
| 3,911,403 | 10/1975 | O'Neill, Jr. | 364/900 |
| 3,976,840 | 8/1976 | Cleveland et al. | 340/825.26 X |
| 4,008,460 | 2/1977 | Bryant et al. | 364/200 |
| 4,063,031 | 12/1977 | Grunza | 381/43 |
| 4,186,438 | 1/1980 | Benson et al. | 364/200 |
| 4,253,157 | 2/1981 | Kirschner et al. | 364/900 |
| 4,334,270 | 6/1982 | Towers | 364/408 |
| 4,346,442 | 8/1982 | Musmanno | 364/900 |
| 4,376,978 | 3/1983 | Musmanno | 364/900 |
| 4,398,250 | 8/1983 | Hosono | 364/900 X |
| 4,432,057 | 2/1984 | Daniell et al. | 364/300 |
| 4,473,824 | 9/1984 | Claytor | 340/825.27 X |
| 4,486,853 | 12/1984 | Parsons | 364/408 X |
| 4,491,725 | 1/1985 | Pritchard | 235/375 |
| 4,547,851 | 10/1985 | Kurland | 364/410 |
| 4,567,359 | 1/1986 | Lockwood | 235/381 |
| 4,577,062 | 3/1986 | Hilleary et al. | 179/2 A |
| 4,881,179 | 11/1989 | Vincent | 364/518 |

FOREIGN PATENT DOCUMENTS 1489571  10/1977  United Kingdom ................ 364/408

OTHER PUBLICATIONS

"Technical Analysis Software Directory", *Wall Street Computer Review*, vol. 2, No. 8, Jun. 1985, 67-70, 72-79.
Everest, G. C. *Database Management*. (McGraw-Hill Book Company: New York) 1986, 746.
Chamoff, M. E. et al. "Dynamic Self-Optimizing Price Lookup for Retail Terminal System", *IBM Tech. Discl. Bull*, vol. 24, No. 2, Jul. 1981, 976-8.

*Primary Examiner*—Ray N. Envall, Jr.
*Assistant Examiner*—Laura Brutman
*Attorney, Agent, or Firm*—Hopgood, Calimafde, Kalil, Blaustein & Judlowe

[57] ABSTRACT

A data processing and communication system distributes and displays financial market ticker, quotation, news and ancillary information via a plurality of stored program controlled work stations. Stock trade executions, quotations and other ticker plant information is communicated in parallel to a hierarchy of system data processing terminals, e.g., those located at area, branch and individual work station locations. Storage media at the several system data processing levels extracts and stores data base information of differing purport and completeness for the disseminated data to support the system work station users.

In accordance with one aspect of the present invention, information characterizing a dynamically changing sub-population of the overall ensemble of market securities is maintained at and becomes immediately available to each work station responsive to the pattern of usage at that specific station. Various derivative tasks, such as security price limit alerts, are user programmable and are activated by the contents of the work station data base.

17 Claims, 5 Drawing Sheets

SYSTEM FOR DISTRIBUTING, PROCESSING AND DISPLAYING FINANCIAL INFORMATION

This is a continuation of copending application Ser. No. 06/626,339 filed on Jun. 29, 1984 now abandoned.

DISCLOSURE OF THE INVENTION

This invention relates to data communication and processing systems and, more specifically, to a system for distributing, processing and displaying financial market data, news and the like.

It is an object of the present invention to provide improved user friendly apparatus for communicating, storing, processing and displaying financial market information, news and other original and derivative data.

More specifically, it is an object of the present invention to provide apparatus and methodology to communicate and display information useful for securities brokers, investors, and others concerned with financial markets; to provide multiple viewing windows to display diverse and/or related ticker and other market information; and which permits interactive user control at system microprocessor governed work stations.

It is another object of the present invention that stored program controlled subscriber work stations in a financial market information communication and display system permit local and immediate access to a dynamically changing sub-population of securities of particular interest; and that full securities data is stored on a hierarchal basis at varying system facilities.

The above and other objects of the present invention are realized in a specific, illustrative system for distributing, processing and displaying financial market ticker, quotation, news and ancillary information via a plurality of stored program controlled work stations. Stock trade executions, quotations and other ticker plant information is communicated in parallel to a hierarchy of system data processing terminals, e.g., those located at area, branch and individual work station locations. Storage media at the several system data processing levels extracts and stores data base information of differing purport and completeness for the disseminated data to support the system work station users.

In accordance with one aspect of the present invention, information characterizing a dynamically changing sub-population of the market securities is maintained at and becomes immediately available to each work station responsive to the pattern of usage at that specific station. Various derivative tasks, such as security price limit alerts and customized, selective ticker displays, are user programmable and are actuated by the work station data base.

The above and other features and advantages of the instant invention will become more clear from the following detailed description of a specific, illustrative embodiment thereof presented hereinbelow in conjunction with the accompanying drawing, in which.

Figure 1A:
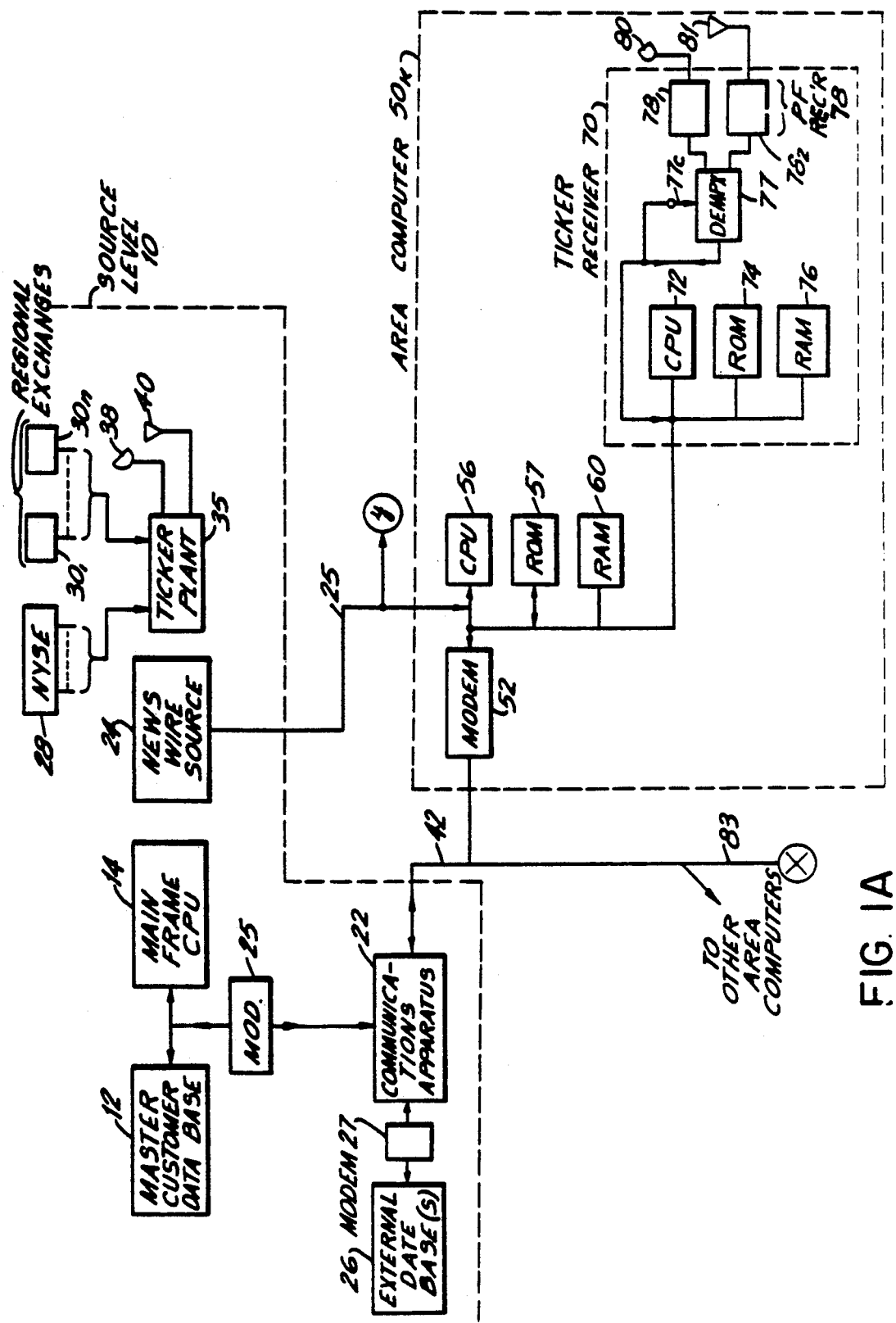
FIGS. 1A and 1B are the upper and lower portions of a schematic block diagram of a system in accordance with the instant invention for distributing, processing and displaying financial information.
Figure 1B:
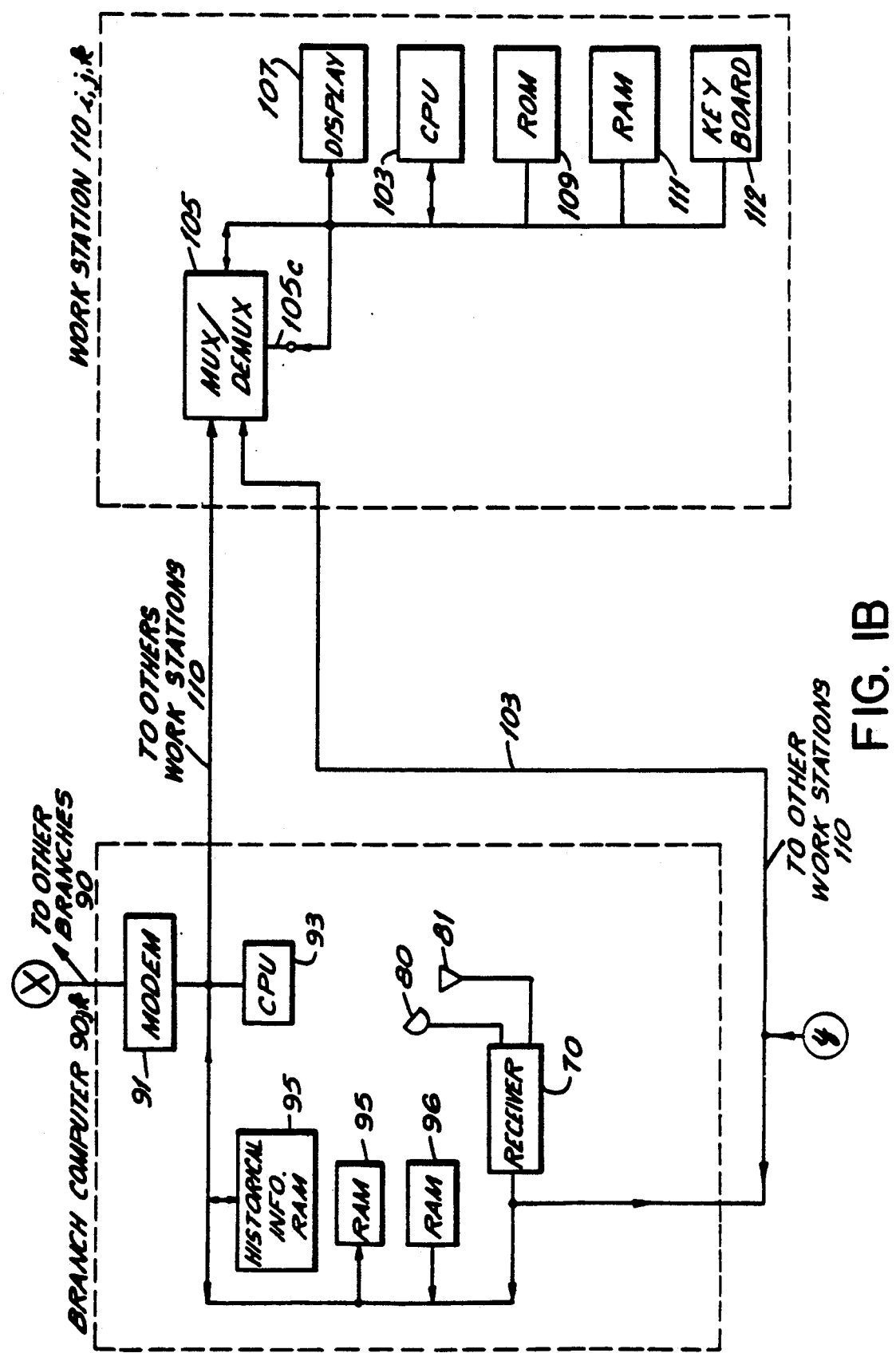

Referring now to FIGS. 1A and 1B, hereinafter referred to as composite FIG. 1, there is shown in block diagram form improved communications and data processing apparatus for communicating information characterizing financial markets generated at a central, common location, and for making that information available at a potentially large number of subscriber work stations $110_{i,j,k}$, e.g., located on desks of brokerage industry account executives, their customers, and/or others whose business or interest is the world of finance. Examining the system in overview, each work station $110_{i,j,k}$ includes a display 107, e.g., a cathode ray tube controlled by a central processor 103. The work station $110_{i,j,k}$ also includes a program containing memory 109, e.g., a read only (ROM) device and variable content memory 111, e.g., a random access (RAM) unit. The user work station RAM 111 contains a good deal of the data of most interest to the specific work station 110 user and, in general, the RAM 111 contents vary from user to user. RAM 111 may also contain programs or program portions.

Each work station $110_{i,j,k}$ has access to information stored in more senior computers in the computer hierarchy of the instant invention. Thus, for example, the broker at the illustrated work station $110_{i,j,k}$ (and all others similarly situated) has access to his branch computer $90_{j,k}$ and, in particular, to the variable content RAM memories 95 and 96 there located which supply information beyond that capable of storage in the RAM 111 of work station $110_{i,j,k}$. Yet further continuing up the computer hierarchy, the work station $110_{i,j,k}$ has access to the contents of a RAM 60 in an area-serving computer $50_k$ with which its branch is associated. Ultimately, all system work stations 110 can access the master customer data base memory 12 in a home office main frame computer.

The basic data characterizing securities trading is generated in the manner per se well known to those skilled in the art. In particular, trading information (e.g., execution prices and volume, and quotations) are supplied by the New York Stock Exchange 28 to a ticker plant 35. Also supplied to ticker plant 35 is comparable trading information from the several so-called regional exchanges $30_1$ through $30_n$. Other, domestic and worldwide information may be included as well. The output of the ticker plant is information characterizing stock trade executions at the respective exchanges, as well as bid and asked quotation information. The output of the ticker plant 35, as presently constituted and per se known, is the ticker of common experience which is distributed typically via land lines to brokerage houses and other financial institutions.

In accordance with the present invention, the ticker plant output is supplied via a microwave uplink 38 for satellite distribution to receive-only earth stations at the area and branch computer locations 50 and 90. For redundant transmission, the ticker information is also radiated on a multiplexed basis with a television program. Such data multiplexing with a television signal is per se well known and may be included, for example, as digital information modulating the video carrier in the vertical retrace interval to not be recoverable by conventional television receivers tuned to the underlying television program. Receiving equipment 70 at the area and branch computer locations 50 and 90 receives the radiated versions of the ticker plant 35 output.

Advantageously for market information continuity assurance, the receiving location apparatus 70 includes antennas 80 and 81 for respectively receiving each of the satellite and television radiated signals. Examining the receiving equipment shown in FIG. 1A for area computer $50_k$, illustrative of all such apparatus, the satellite and VHF or UHF television-multiplexed signals are respectively received at antennas 80 or 81 and detected by RF receivers $78_1$ and $78_2$. Antenna surrogates, such as cable television delivery systems, may be employed. A demultiplexer 77 selects the base band data stream output of one or the other of radio receiver/detectors $78_1$ or $78_2$ under control of central processor 72 in accordance with any appropriate algorithm stored in a ROM memory 74. Thus, for example, the CPU can receive and temporarily store in a RAM 76 the data stream outputs of both receivers $78_1$ and $78_2$ and select that one exhibiting the lower error rate. Other selection algorithms will be readily apparent to those skilled in the art.

The securities trading information is thus coincidentally supplied directly to each of the system branch and area computers 90 and 50 in parallel on an over-the-air, radiated basis. In each area computer 50, e.g., the unit $50_k$ shown in FIG. 1A, the received trading information is stored by the main central processing unit 56 under control of the program stored in read only memory 57. In the area computer $50_k$, which is senior in the computer 50-90-110 hierarchy of FIG. 2, complete market data for substantially the entire population of monitored securities is retained in RAM 60. The functions of elements 72, 74 and 76 could of course be performed directly by elements 56, 57 and 60.

Correspondingly, in a branch computer 90, e.g., the computer $90_{j,k}$, variable content RAM memory 96 makes no attempt to store all of the monitored securities. Rather, RAM memory 96 stores information for only a subset of the entire securities population corresponding to those securities which are of generally popular interest. Computer $90_{j,k}$ memory 96 thus retains current market information for a securities population less than that of the area computer $50_k$ but substantially greater than that retained in RAM 111 of the work stations $110_{i,j,k}$ associated with the branch $90_{j,k}$.

As a matter of overall system philosophy, when a work station $110_{i,j,k}$ seeks current price information for a security not then within its memory 111, it seeks such information from its associated branch computer $90_{j,k}$. If the information is not available at the branch level, the branch computer $90_{j,k}$ inquires of the area computer $50_k$ via connecting modems 91 and 52 and communications link 83. Thus a reasonable amount of memory and computing power is employed at the several system hierarchal levels commensurate with the reasonable needs of those levels. All information is obtainable at a work station 110 either from its internal storage, from its branch, or from its area. Additional information may be obtained, as needed, from the home office main frame central processor 14 and data base 12 (source level 10) via communications apparatus 22 (e.g., the switched telephone network) and modem 25; or from external data base(s) 26 via a modem 27.

The illustrative branch computer $90_{j,k}$ includes a RAM 95 which stores historical information characterizing securities of interest, e.g., past earnings, price earnings ratio, dividend history, annual high and low prices, and so forth. Such information is available to any work station 110 associated with that branch $90_{j,k}$ via appropriate keyboard 112 entries ("full quote") at the work station. The current stock price information RAM 96 and the historical, corporate information stored in RAM 95 are shown distinct in FIG. 2. The two memories 95 and 96 may of course be separate or commingled portions of a single such memory.

As a final source of information for the system of FIG. 1, one or more source level 10 news wire source(s) 24 supply financial news via land lines 25 to the various area and branch computers 50 and 90 and, via the branch computers, to the various work stations 110. Illustrative of currently available news wire sources are those provided by Dow Jones and Reuters. Alternatively, the news information furnished by source 24 can be multiplexed and radiated with the output of ticker plant 35 for distribution to area, branch and work station computers.

It is an objective and purpose of the instant invention to make use of the market and news information generated by ticker plant 35 and news wire source(s) 24 at the various system work stations 110. That is, the work stations 110 have a signal entry keyboard 112 which may be employed by a user (e.g., a broker) to specify various kinds of information desired for viewing via his display 107. As above noted, part of the market information resides within his work station in RAM 111. Additional quotations not already at his location are loaded via multiplexer/demultiplexer 105 under central processor 103 control via multiplexer control port $105_c$ from the associated branch computer 90 or area computer 50. The information presented at display 107 may comprise a single field of information, e.g., a quotation, a ticker flow or the like. Alternatively, in accordance with one aspect of the instant invention, a multi-window display may be presented via the cathode ray tube 107. Moreover, depending upon the user-entered key strokes, the specific format of the multi-window display may vary. Presenting plural "windows" or fields on a single cathode ray tube display is of course per se well known to those skilled in the art and is available via IBM, Bell Laboratories and others.

Figure 2:
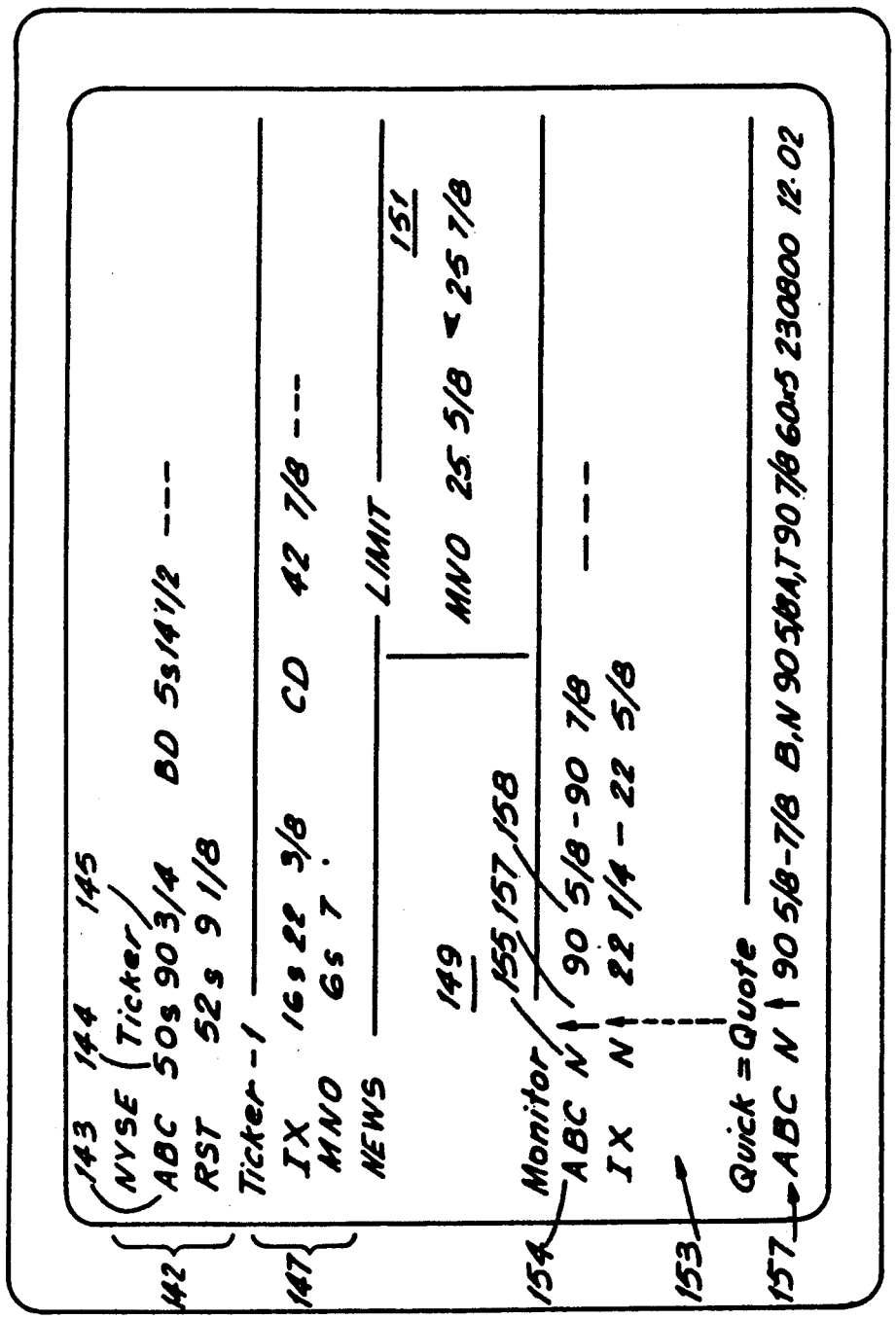
FIG. 2 is an illustrative display presented to a system user via a work station cathode ray tube in accordance with the principles of the present invention.

One illustrative multi-window presentation for display 107 at a system work station 110 is shown in FIG. 2. The composite presentation has a first field 142 which simply comprises the complete New York Stock Exchange ticker (a series of stock transaction messages for stock executions on that exchange). The field includes a sequence of messages each formed of a stock symbol 143 followed by the volume (in hundreds of shares) 144 and the trade price 145. The price 145 may have its first digit deleted, and volume may be omitted on reasonably busy days to obviate undue ticker delays. Examining, for example, the first trade constituent in the ticker data field 142 in display 107, one viewing the ticker would know that 5,000 shares of the security having an exchange symbol ABC traded at a price of 90⅛.

The multiple window display format chosen by the user via keyboard 112 includes a second ticker ("TICKER-2") specified under the user control. In accordance with varying aspects of the present invention, the user may format his own personal ticker by establishing criteria which a trade message from ticker plant 35 must satisfy to pass to the TICKER-2 window field 147 for viewing. The criteria, stored in RAM 111, may specify trades in only a specific enumerated list of securities, trades from specific exchange(s), and/or so forth. This gives rise to a relatively slow speed, focused ticker which eliminates the clutter associated with trading of securities of no interest to the operator of the specific work station 110.

A display field 149 forms a scrolling presentation of the news reported via the source 24; and a field 151 in the particular display format shown contains limit-exceeding information. The entry illustrated in FIG. 2 identifies a security (MNO) which has last traded (25⅝) outside (lower) a bound (25⅞) stored in RAM 111. Upside and downside limits are often used by brokers and investors as buy or sell conditions and are of interest both to the broker and to his customers owning those securities.

A further, MONITOR field 153 contains price information for a predetermined population of securities of interest to that particular broker. Each entry includes an identification 154 (the stock symbol), a designation 155 of the market where the last trade occurred, an arrow 157 signalling whether the last trade was an uptick or downtick, and the currently obtaining bid and ask prices 158. Finally, a QUICK-QUOTE field 157 provides a quotation for a particular stock (ABC) having a symbol entered by the user via keyboard 112. Reading across the illustrative entry of FIG. 2, the stock symbol is followed by an identifier for the exchange executing the last trade (New York) in the security, an arrow showing the tick direction of the last trade (up), the trade price (90⅞), the current bid (90⅝) and asked (90⅞) prices and the exchanges where those bid and ask prices came from (bid-Boston and New York, asked-American and Toronto), the bid and ask volume sizes (60 and 5 respectively), the number of shares (230,800) of that security traded so far during that business day, and the time of the last trade (12:02).

Other windows in addition to or superimposed upon the display of FIG. 2 may be employed as well. Thus, for example, a field may signal the operative stored securities limits as just one example among many.

Each of the data fields in FIG. 2 may be displayed, alone, on the face of the cathode ray tube under user control entered via the keyboard 112. Alternatively as above discussed, one of various multi-window formats may be specified via the keyboard 112, as again is per se well known, to present a number of data fields simultaneously.

As alluded to above, it is one of the offices of the instant invention to store within each work station $110_{i,j,k}$ and in particular in the RAM memory 111 there located, information characterizing the securities of interest to that broker or other work station user. To that end, the stored computer program automatically stores in the variable content RAM memory 111 of the subject work station securities identification and price data corresponding to a limited, predetermined number (e.g., 300 for purposes of specificity only) of securities whose price information was last requested at that work station. When the station 110 is at its upper storage limit (300), a new quotation request automatically causes the central processor 103 to discard the oldest security in the limited stored population, i.e., the one last viewed prior to later quotation requests for 300 different securities.

As new trades in the monitored 300 security population are reported via the ticker plant 35, communications link receiver 98, demultiplexer 105 and work station central processor 103 automatically change the stored price information in RAM 111. The stored security price information also automatically changes the price presentation for the respective securities wherever a security appears in any of the multiple windows (fields) of the display 107. That is, new price information for any particular stock will change in each window in which that security appears. For example, a price change in the price of the equity whose symbol is assumed to be ABC for the illustrative display of FIG. 2 causes changes in at least the MONITOR field 153, the NYSE Ticker 142, and in the QUICK-QUOTE field 157 all of which derive their refreshed information from the work station data base in RAM 111. If the last trade exceeded a limit, an appropriate message would be generated as well in field 151.

Figure 3:
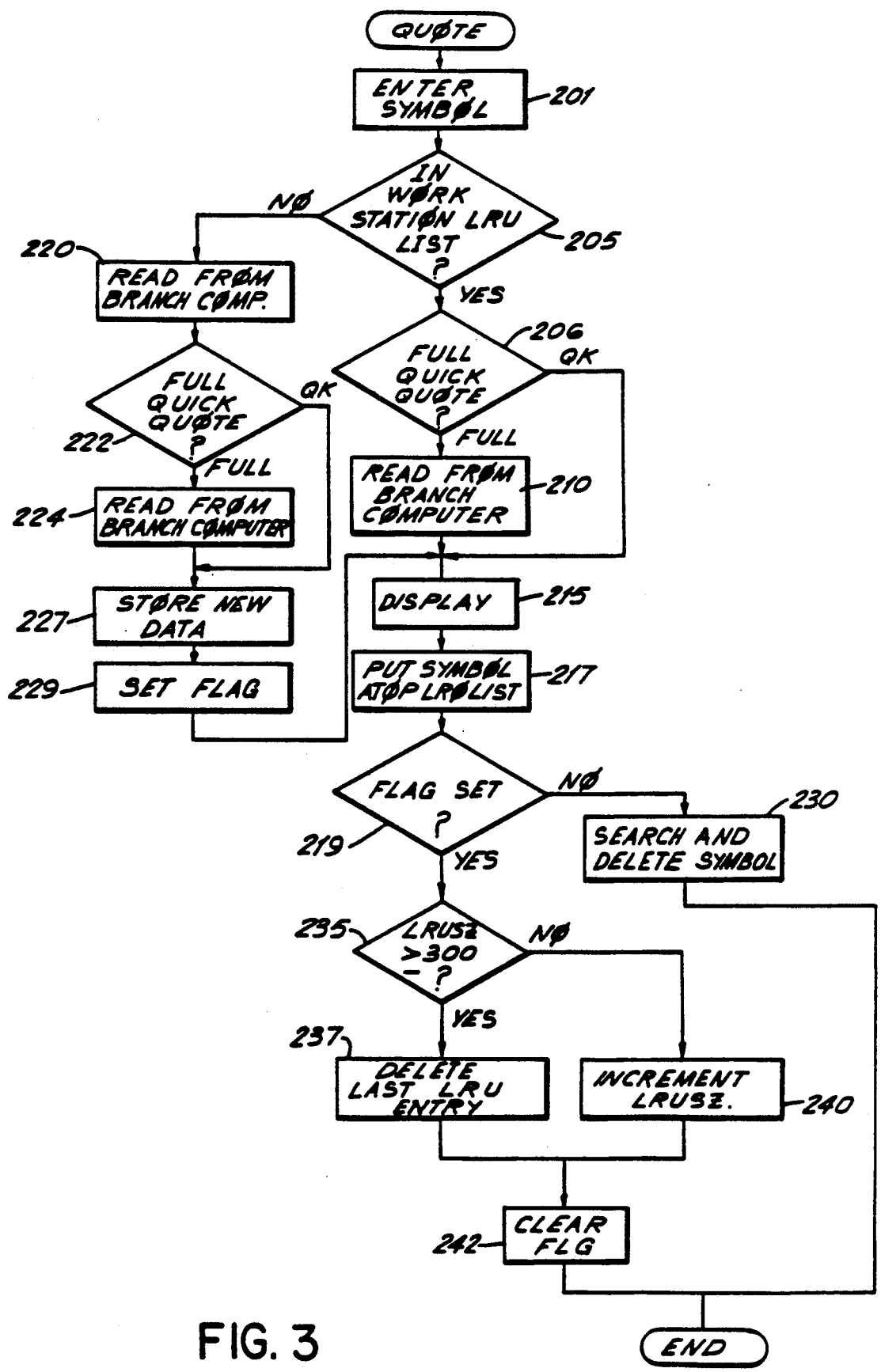
FIG. 3 is a flow chart illustrating user work station data processing to generate quotation information and to dynamically update the work station data base market security sub-population.

Attention will now be directed to the flow chart of FIG. 3 which presents the operative program for maintaining the data base in the work station 110 RAM 111 to reflect the limited (300) entries most recently queried at that specific work station. The program for dynamically controlling storage at the user's work station 110 is typically stored in the read only memory, or ROM 109 there included although RAM 111 storage is also possible. To reiterate, it is the function of the dynamic storage algorithm to maintain in the variable, RAM memory 111 at the user's station 110 information associated with the 300 securities for which quotations were most recently requested at that station (and which are thus most likely to generate future quotation requests). To this end, RAM 111 includes a "least recently used" or LRU list which stores the stock symbols of the most recently requested 300 (or fewer) securities. It will be assumed that the most recently requested security resides in the top, or first position, in that list; and that the least recently requested symbol is stored at the bottom of the list in a jeopardy position to be purged if a new security, not otherwise in the LRU list, is entered at the work station keyboard 112 (assuming a full complement of 300 items). A processing variable LRUSZ is maintained to indicate the size or number of items in the LRU list. Programming for the instant invention may of course be in any convenient language which is stored and implemented on any of the diverse forms of digital processing apparatus.

To illustrate specific operation of the dynamic storage reallocation algorithm, assume that a broker or other user at the work station $110_{i,j,k}$ illustrated in FIG. 1B wishes a quotation on any desired security. He enters the corresponding symbol for the security as by his signal entry keyboard 112 (functional step 201 in FIG. 3). Test 205 then examines the LRU table to determine whether the newly entered stock symbol is already in the LRU list. If it is (YES output of test 205), test 206 examines the command message entered through keyboard 112 to determine whether the user wishes a full quote (e.g., including historical and derived (e.g., price-earnings ratio) information not locally available at the work station 110 or the more common so-called quick quote price and volume information which is locally available. If a full quote is desired, the work station 110 obtains the historical information from the historical information memory 95 in the branch computer $90_{j,k}$ via the communicating demultiplexer 105. If desired, historical information of varying levels of detail may be distributed between the branch and area RAMs 95 and 60. In either event, either the quick quote or full quote after data retrieval from RAM 95 is displayed for the user (step 215) as via the user's cathode ray tube display 107.

Tracing the alternate output path from the test 205, assume that the stock symbol requested was not one recently examined at the specific work station $110_{i,j,k}$ and therefore was not in the LRU list locally available from the work station 110 RAM 111 (NØ output path of test 205). When this condition obtains, the desired quotation is retrieved from the branch RAM 96 (or higher order computer if necessary)—step 220. Depending upon whether a full quote or quick quote was specified by the input command entered by the user at keyboard 112, test 222 fetches the full information from the branch RAM 95 if appropriate (step 224) or skips this operation if only a quick quote was desired. The following operation 227 stores the securities information just obtained in the user's work station variable memory 111, and step 229 sets a flag bit in some predetermined location (e.g., FLAG) to signal that FIG. 3 processing is dealing with a security not previously stored at the user's work station 110 memory 111. As before, the quotation information is displayed in its full or quick (limited) form in the display step 215.

Following delivery of the information to the user's display 107, the symbol for the security just requested by the user is put on top of the LRU list which signals that this security was most recently requested at the work station $110_{i,j,k}$ (step 217).

The remainder of the functional operation depicted in FIG. 3 then serves to maintain the least recently used (LRU) list in correct form as well as to maintain the list size variable (LRUSZ) at the correct value. To this end, test 219 examines the contents of the flag bit (FLAG) to determine whether or not the symbol most recently processed was new to the data table (it being new following the NØ output of test 205 but not for the YES output of that test). If the flag bit was not set (NØ output of test 219) signalling that the stock symbol (and its concomitant information) was already in the LRU list and in the RAM 111 data table, step 230 searches through the LRU list after position 1 and deletes the second appearance of the symbol in the list. The symbol is deleted since it is known to be in the first or most senior position in the LRU list as a result of step 217 and thus its redundant presence is discarded. That completes operation of the FIG. 3 dynamic storage reallocation for the assumed branch of data processing which thus goes to the end point of the subroutine and passes to system control for other system business.

When test 219 signals that the flag bit was set (YES output signalling that the symbol was new to the LRU list) test 235 next determines whether or not the LRU list is at its maximum size (LRUSZ ≧ 300). If it is not, the data table can accept a new symbol without deleting an old one. Accordingly, the LRU size variable is incremented by one (LRUSZ=LRUSZ+1) in step 240, the flag bit is cleared (step 242), and processing is completed. Correspondingly, if the LRU table is full (YES output of test 235), the bottom element in the LRU list is deleted (step 237). The flag bit is then cleared (step 242) ending the routine.

Accordingly, the FIG. 3 mode of data processing automatically maintains within the work station 110 RAM 111 a list (LRU) of the 300 most recently requested stock symbols at that station. The newer of the stock symbols requested are in the top portion of the list while the older symbols are in the bottom part of the list, with symbols being deleted if they are not requested a second time before 300 other quotations are entered at the user keyboard 112.

It will be apparent that the stock symbols in the LRU list and the corresponding stock price values and other information, will vary from time to time for any user of the equipment $110_{i,j,k}$ and will differ at any given time for different system work stations presumably having operators who enter different patterns of quotations. The local variable memory 111 of each work station 110 will thereby store the information most likely to be next needed by each station user and which will be quickly available to that person, not requiring interrogation (other than for "historical" information) from any other system computer thus obviating communication and possible queueing delays.

Figure 4:
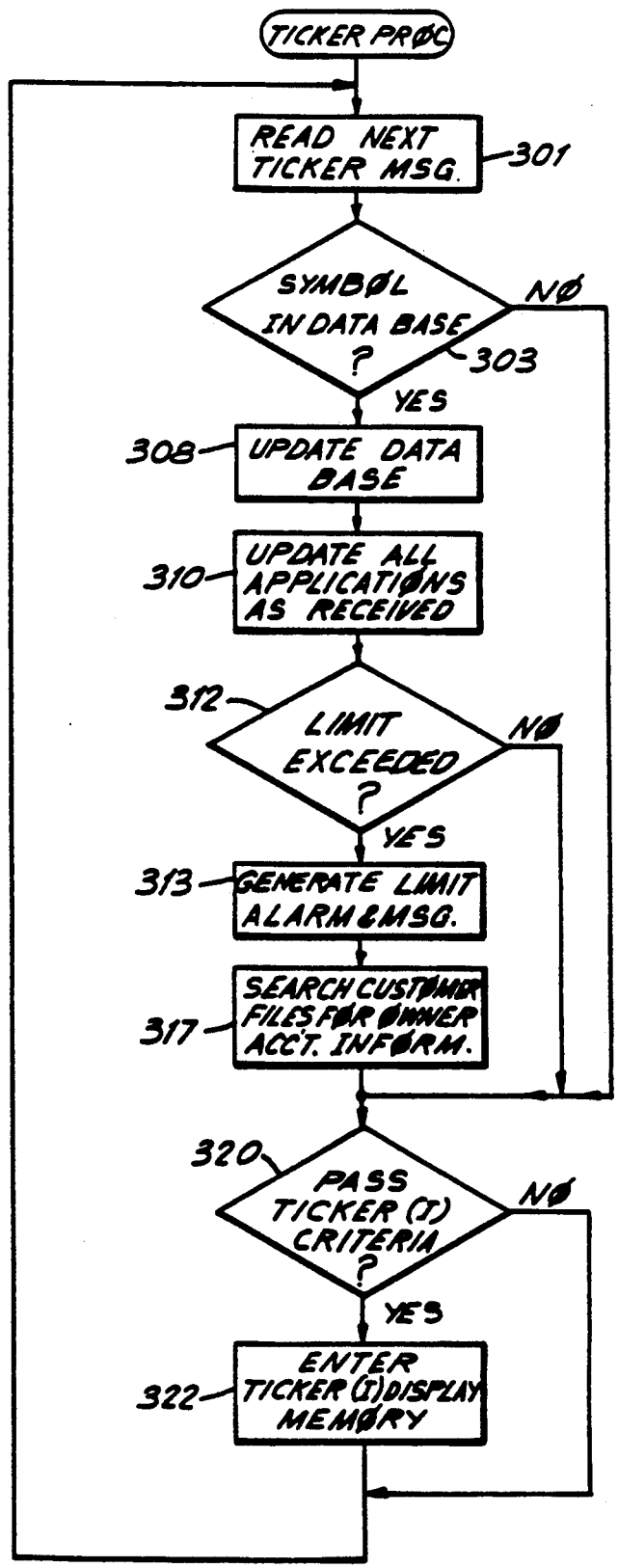
FIG. 4 is a flow chart illustrating work station ticker and related processing in accordance with the instant invention.

Finally, attention will be directed to the flow chart of FIG. 4 which presents the operative program for dynamically updating data in the user's RAM 111 data base characterizing the stocks having a present application for that user. That is, FIG. 4 depicts the manner in which current price and other market data is loaded into the user's RAM 111 to provide current information for each component of the display (FIG. 2) of the user's cathode ray tube 107. It will be assumed for simplicity of discussion that each separate display application (FIG. 2 field or window) has an associated list in RAM memory 111 of those symbols currently of interest, i.e., there exists a first list (LRU table) for the 300 most recently requested quotations, a second list for those securities for whom limits are being maintained, further lists for the ticker presentations, and so forth. Each list would contain or have a pointer to all data for each security in that list. Alternatively, a single integrated list and data table may be employed for all stocks for which there is any current application, together with one or more identifiers which record those application(s) for which the stock data is required.

Examining the flow chart of FIG. 4, the first step 301 reads into the computer CPU the next incoming stock symbol, price, volume and related information (ticker message) originated by ticker plant 35, and furnished to the work station $110_{i,j,k}$ via its corresponding branch apparatus 70,80,81 via cable 103 and demultiplexer 105. Test 303 examines each of the application stock lists (i.e., the LRU list, the list associated with the limit processing, and so forth). If the security being characterized by the ticker plant message is not in any such list (NØ output of test 303), control passes to test 320 to determine whether or not the stock data is appropriate for one of the tickers (e.g., 142 or 147 of FIG. 2) in the user display. Assuming that the trade information being reported by ticker plant 35 is germane to one or more of the applications for that specific work station 110, the data base in RAM 111 associated with that security is updated (step 308) to reflect the last trade and quotations for that stock and step 310 updates all applications (windows and the related window-driving storage) associated with that stock as necessary. Thus, as only one example and assuming that the stock having the trade information then being reported by the ticker plant was in the LRU list and data base, the information being reported replaces the older data for that security stored in the data base of the user's RAM 111.

Assuming the stock to be one maintained in the limit table (supporting display field 151 of FIG. 2), test 312 determines whether the trade being reported exceeds any limit bound. If it does not (NØ output of test 312), system control passes to test 320 for ticker processing. If a limit is exceeded (YES output of test 312), a limit-exceeding message appears in the field 151 of FIG. 2 advising the user of the appropriate circumstances. It will be readily apparent that a price may be tested against upper and/or lower bounds as desired for the investment strategy of the user, or of the customers of the user. In addition, step 317 recalls from the master customer data base 12 via multiplexer 105 the branch modem 91 and all remaining communication apparatus intermediate the data base 12 and work station 110 the name, account number, telephone number and all other desired information for all customers who hold the security for which the user's station has indicated an out-of-limit message. As appropriate the user may contact each such owner of the subject security to determine if any action is desired or to take such automatic action as may be appropriate.

Finally, test 320 examines the subject ticker plant 35 message to determine whether or not it is appropriate under the criteria established by the user at his work station 110 for either of the ticker streams 142 or 147 being displayed. If the criteria is satisfied (YES output of test 320) the message is added to the appropriate ticker display memory or memories for entry into the appropriate ticker. The ticker criteria as above noted is subject to definition by the user. If the user has limited a ticker to a finite group of stocks, the ticker criteria is satisfied if and only if the stock symbol in the incoming message matches a stored desired symbol. Other criteria will be readily apparent, e.g., to display only trades from a particular exchange (part of the data transmitted by ticker plant 35). If the ticker plant message is not appropriate for display on any ticker (N$\phi$ output from test 320), control passes to the beginning of FIG. 4 processing to await the next trade quotation being supplied by the master ticker plant 35 (or to shift to other system functions).

FIG. 4 processing thus serves to maintain the data in the user RAM 111 current with respect to each of the applications then contemplated by that unit; and to also limit the data shown on the display tickers to that information which the station 110 user wishes to receive. The composite apparatus of FIGS. 1A and 1B operates flexibly to monitor and display only that information which each work station 110 user wishes stored and displayed and to provide rapid access to a limited portion of the very large mass of securities data which serves the particular user pattern and personality of each work station operator, providing rapid access to information which that user is most likely to require.

The above-described apparatus and methodology is merely illustrative of the principles of the present invention. Numerous modifications and adaptations thereof will be readily apparent to those skilled in the art without departing from the spirit and scope of the present invention.

What is claimed is:

1. In combination in system apparatus for disseminating and selectively processing and displaying financial information for a population of n investment securities, when n is a positive integer; said system apparatus comprising a hierarchal arrangement of variable content memory means disposed in a plurality of digital processing individual, branch, and area work stations, said hierarchal arrangement characterized by progressively completed variable content memory means; each of said individual work stations including a display, a central processor, variable content memory means, memory means containing a program, and signal entry means; said variable content memory means including plural storage elements for storing data characterizing a sub-population k of the population n of investment securities where k<n; said signal entry means for requesting display of selected financial information stored in said variable content memory means; trade information means for serially furnishing current trade information messages for the population of investment securities in parallel to said central processors of said work stations; said program containing means for controlling said central processors; said central processors of each of said work stations operatively selecting data received from said trade information means corresponding to said stored security sub-population and updating the data in said variable content memory means for said stored security sub-population.

2. A combination as in claim 1, further comprising means coupled to said trade information means for storing in one progressively completed variable content memory means data characterizing substantially all of said population of n investment securities, and means connecting said progressively completed variable content memory means with said central processors of each of said work stations.

3. In combination in system apparatus for disseminating and selectively processing and displaying financial information for a population of n investment securities, when n is a positive integer; said system apparatus comprising a hierarchal arrangement of variable content memory means disposed in a plurality of digital processing individual, branch and area work stations, said hierarchal arrangement characterized by progressively completed variable content memory means; each of said individual work stations including a display, central processor, variable content memory means, memory means containing a program, and signal entry means, said variable content memory means including plural storage elements for storing data characterizing a sub-population k of the population n of investment securities where k<n; said signal entry means for requesting a display of selected financial information stored in said variable content memory means, trade information means for serially furnishing current trade information messages for the population of investment securities in parallel to said central processor of said work stations; said program containing means for controlling said central processors; said central processors of each of said work stations operatively selecting data received from said trade information means corresponding to said stored security sub-population and updating the data in said variable content memory means for said stored security sub-population wherein said variable content memory means in at least one of said work stations further comprises means responsive to quotation requests entered via said signal entry means, said responsive means for extracting and displaying via said display data characterizing said security sub-population retrieved from the group consisting of said station variable content memory means and variable content memory means from another of said hierarchically arranged work stations; and means for dynamically maintaining in said stored securities sub-population in said station variable content memory means data for a changing array comprising the more recently quoted securities of said population entered via said signal entry means.

4. A combination as in claim 1, wherein said variable content memory of at least one of said work stations includes means for storing an identifier for a security in said population and at least one price range bound for said identified security, and wherein said central processor means includes means for indicating when a received ticker message for said identified security has a trade price component which falls outside a stored range bound for said security.

5. A combination as in claim 3, wherein said variable content memory means of at least one of said work stations includes means for storing an identifier for a security in said population and at least one range bound for said identified security, and wherein said central processor means includes means for indicating when a received ticker message for said identified security has a trade price component which falls outside a stored range bound for said security.

6. A combination as in claim 2, wherein said progressively completed variable content memory means includes a hierarchy of additional storage apparatus each containing data characterizing a monotonically larger proportion of said population of investment securities.

7. A combination as in claim 1, further comprising a customer data base, and communications means selectively coupling each of said work stations with said customer data base.

8. A combination as in claims 1 or 4, further comprising data processing means including additional memory means, said data processing means including receiver means for receiving serial data supplied by said ticker source means, means for storing in said additional memory means data characterizing a substantially larger number of said investment security population than said k element sub-population stored in said work station variable content memory means, and means connecting said data processing means with a plurality of said digital processing work stations.

9. A combination as in claims 2 or 6, wherein said progressively completed variable content memory means includes means for receiving historical financial data for said securities population.

10. A combination as in claim 8, wherein said ticker source means includes transmitting means for providing over-the-air transmission of said current trade information messages, and wherein said ticker receiver means in said data processing means includes means for recovering the current trade information transmitted by said ticker source transmitting means.

11. A combination as in claim 10, wherein said transmitting means of said ticker source means includes means for radiating said current trade information on two redundant channels, and wherein said current trade information receiver means of said data processing means includes means for selecting for reception one of said two redundant transmission channels.

12. In combination in system apparatus for disseminating and selectively processing and displaying financial information for a population of investment securities; said system apparatus comprising a hierarchal arrangement of variable content memory means disposed in a plurality of digital processing individual, branch and area work stations, said hierarchal arrangement characterized by progressively completed variable content memory means, each of said individual work stations including a display, central processor, variable content memory means, memory means containing a program, and signal entry means, said display effecting a coincident multi-window presentation of at least one formatted ticker and plural data fields, said program containing means for controlling said work stations central processor, said variable content memory means including means for storing acceptance criteria for each ticker display and means for storing data characterizing a sub-population of the population of investment securities sufficient for all securities included in said plural data fields; trade information means for furnishing current trade messages for the population of investment securities to said central processors of said work stations; said central processor of each of said work stations including means for operatively selecting data received from said trade information means corresponding to said stored security sub-population and for updating the data in said variable content memory means for said stored security sub-population, and said central processor of said work stations further including means for extracting acceptance criteria from said variable content memory means, means for comparing each received current trade message from said trade information means for selectively displaying at least a portion of said received message in said ticker display.

13. A combination as in claim 12, further comprising additional memory means, means coupled to said ticker source means for storing in said additional memory means data characterizing substantially all of the population of investment securities, and means connecting said additional memory means with said work stations.

14. A combination as in claim 13, wherein said variable content memory means in one of said work station stores a security sub-population of predetermined size, means responsive to quotation requests entered via said signal entry means for extracting and displaying via said display means data characterizing said security sub-population retrieved from the group consisting of said variable content memory means and said additional memory means; and means for dynamically maintaining in said stored securities predetermined sub-population in said variable content memory means data for said predetermined number of most recently quoted securities of said population entered via said signal entry means.

15. A combination as in claims 12 or 13, wherein one of said data fields signals an out-of-limit price for one of said population of securities, wherein said variable content memory means of said work stations includes means for storing a securities identifier and at least one range bound therefor, and wherein said central processor means includes means for displaying an indication when a received ticker message for a monitored security has a trade price component which falls outside a stored range bound therefor.

16. A combination as in claim 1, wherein said variable content memory means in at least one of said work stations further comprises means responsive to quotation requests entered via said signal entry means for extracting and displaying via said display characterizing said security sub-population retrieved from said station variable content memory means, and means for dynamically maintaining in said stored securities bu-population in said station variable content memory means data for a changing array comprising the more recently quoted securities of said population entered via said signal entry means.

17. A combination as in claim 8, wherein said additional variable content memory means includes means for receiving historical financial data for said securities population.

* * * * *